United States Patent

[11] 3,618,090

[72] Inventor John B. Garrison
Silver Spring, Md.
[21] Appl. No. 20,231
[22] Filed Apr. 5, 1960
[45] Patented Nov. 2, 1971
[73] Assignee The United States of America as represented by the Secretary of the Navy

[54] RADAR
16 Claims, 17 Drawing Figs.
[52] U.S. Cl........................................................ 343/16 R, 343/911
[51] Int. Cl........................................................ G01s 9/02
[50] Field of Search.......................................... 343/10, 11, 16, 18, 115, 118, 100, 911 L, 911

[56] References Cited
UNITED STATES PATENTS
3,264,642 8/1966 Lamberty.................... 343/911 X
3,384,890 5/1968 List et al..................... 343/911 X
3,453,637 7/1969 Garrison..................... 343/911 X Primary Examiner—T. H. Tubbesing
Attorneys—R. S. Sciascia and J. A. Cooke CLAIM: 1. A radar comprising a spherical lens, wave-generating means, a plurality of feed means positioned adjacent the surface of said lens for applying the output of said wave-generating means at selected points on the surface of said lens, ans switching means for selectively connecting individuals of said feed means to said wave-generating means to transmit a beam of energy along an axis determined by the position upon the surface of said lens of the particular feed means selected.

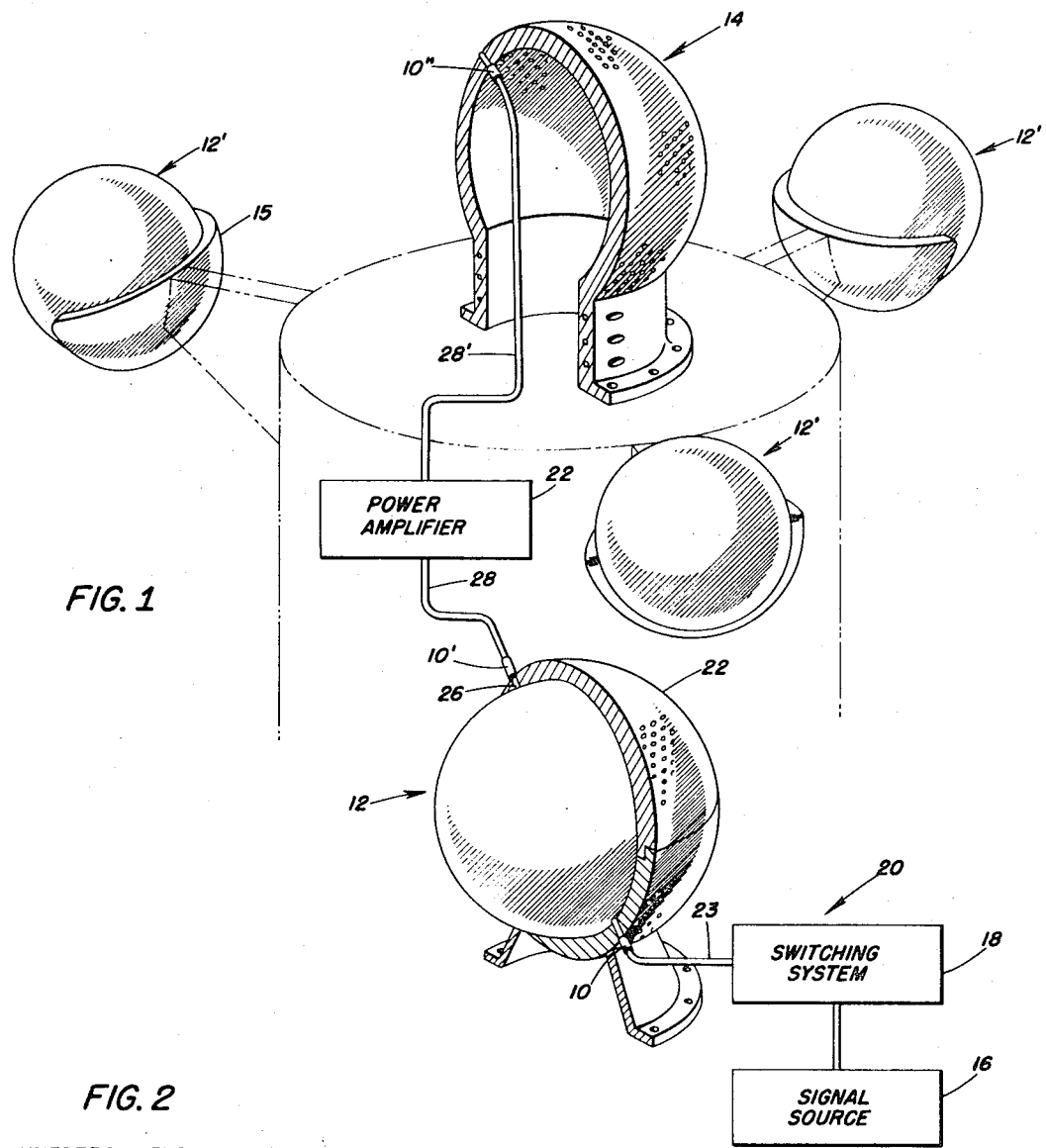

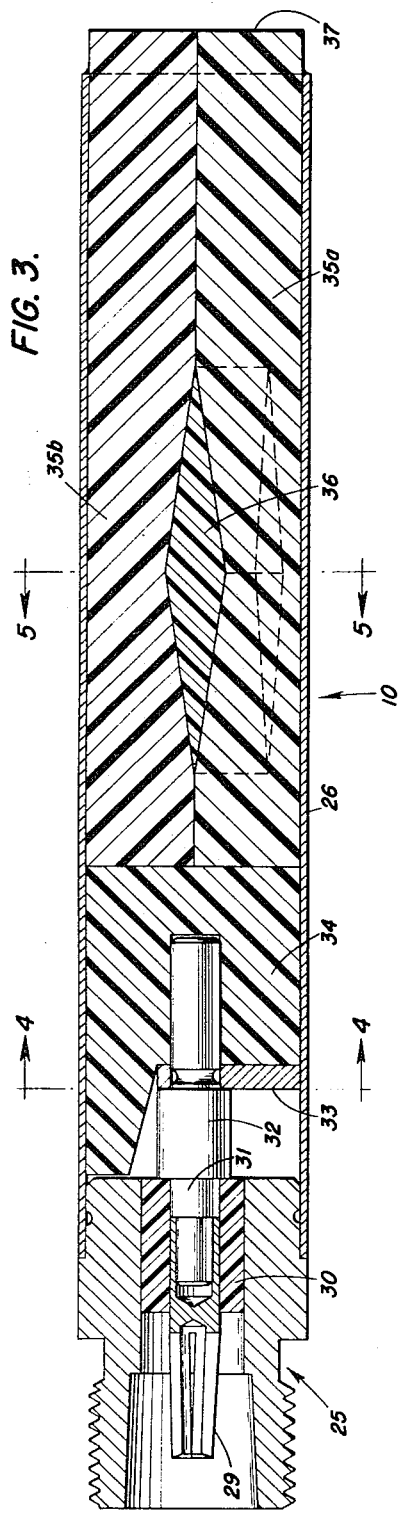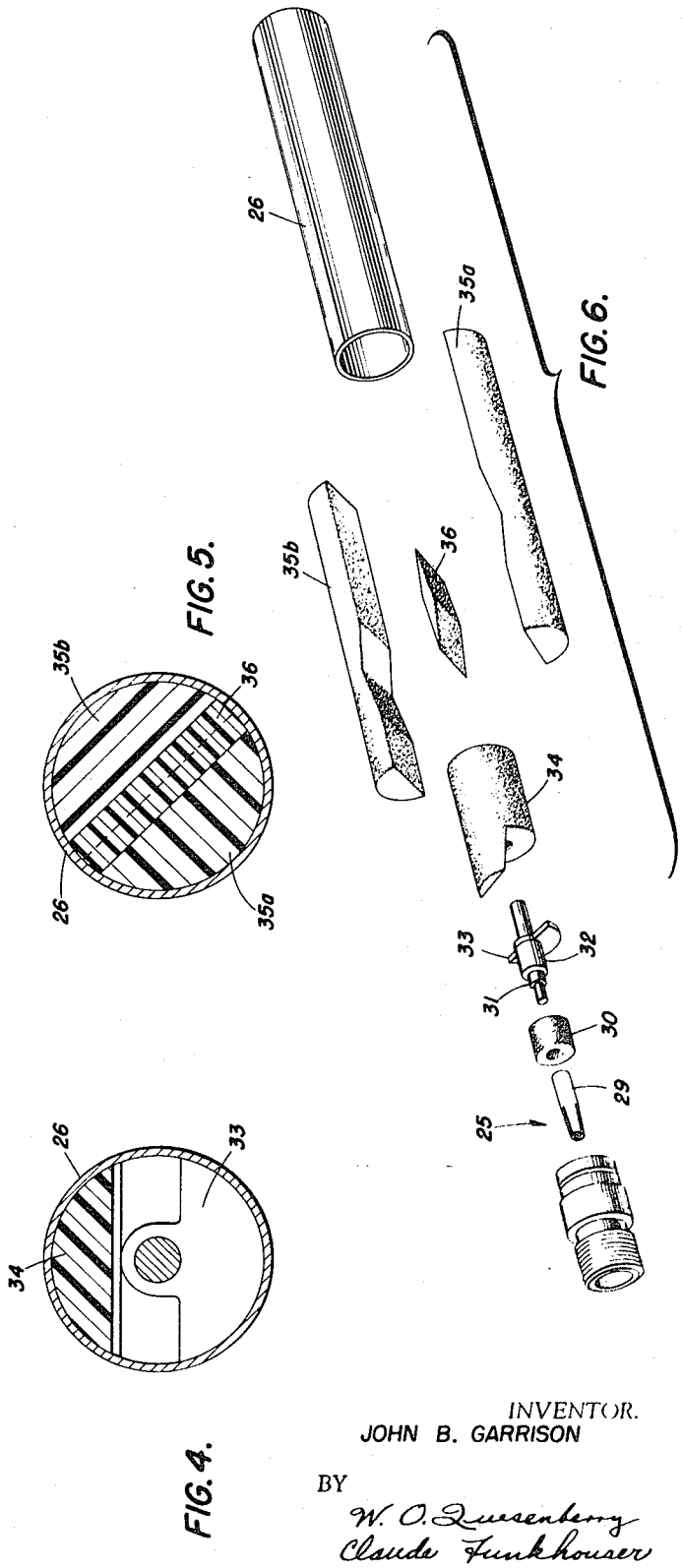

FIG. 8.
FIG. 12.
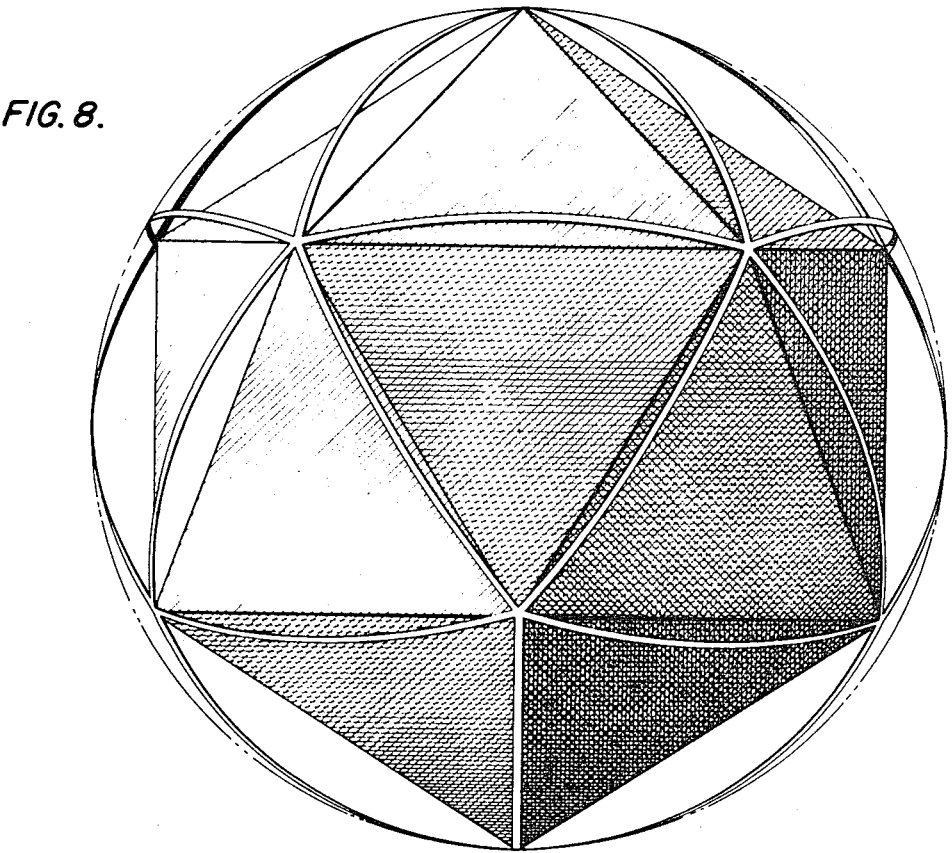
FIG. 10.
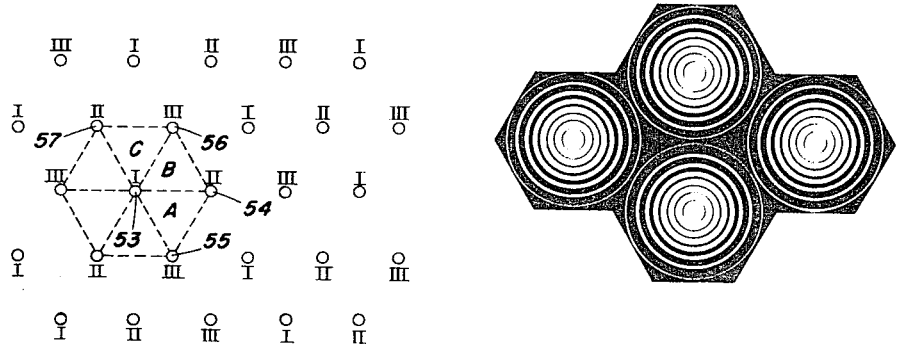
INVENTOR.
JOHN B. GARRISON
BY
ATTORNEYS $$e_O = c + \log_a e_{IN}$$

INVENTOR.
JOHN B. GARRISON

INVENTOR.
JOHN B. GARRISON

RADAR

The present invention relates to a radar. More particularly it relates to a radar employing a plurality of fixed radiating elements which nevertheless is capable of directing a beam of energy in any desired direction throughout a full panoramic hemisphere of space.

The radar of the present invention dispenses with a mechanically positioned directive antenna and thereby creates its primary and most obvious difference with heretofore known types. Prior radars alter the direction of beam pointing by changing the position of a cumbersome reflector or lens-type antenna possessing high inertia. Because of the inertia, it is impossible to change the beam direction of prior radars at the extremely high rates required for the simultaneous tracking of a plurality of targets.

It is therefore an important object of the present invention to provide a radar capable of radiating a concentrated beam of energy in any desired direction.

It is a further object of this invention to provide a radar in which the direction of beam pointing is controlled by electrical switching means thereby enabling a nearly instantaneous change in the direction of pointing.

Another object of the invention is to provide a radar capable of performing simultaneously or interchangeable the functions of a prior search radar and a prior tracking radar.

An additional object of the invention is to provide a radar well suited to the multiplex operation of tracking a plurality of targets which may be at widely separated locations with respect to the radar.

It is also an object of the present invention to provide a radar capable of functioning with an extended bandwidth of frequencies to permit the incorporation therein of counter-countermeasures.

Still another object of the invention is to provide a radar particularly adapted to use at sea.

Other objects and many of the attendant advantages of this invention will be readily appreciated as the same becomes better understood by reference to the following detailed description when considered in connection with the accompanying drawings, wherein:

FIG. 1 is a pictorial representation of the radar of the present invention having certain elements thereof shown in section to reveal their inner construction;

FIG. 2 is a schematic of a Luneberg lens which forms an important element of the radar;

FIG. 3 is a section of a primary feed employed in the radar;

FIG. 4 is a section taken along the line 4—4 of FIG. 3;

FIG. 5 is a section taken along the line 5—5 of FIG. 3;

FIG. 6 is an exploded perspective of the feed of FIG. 3;

FIG. 8 is an elevation of an icosahedron with a circumscribing sphere shown in phantom, illustrating the division of a sphere into equal area spherical triangles;

FIG. 10 is a projection of a portion of the spherical triangle of FIG. 9 illustrating the classification of feed elements according to their relative locations;

FIG. 12 is an example of the analog antenna pattern chart employed as a memory device in the radar;

Figure 7:
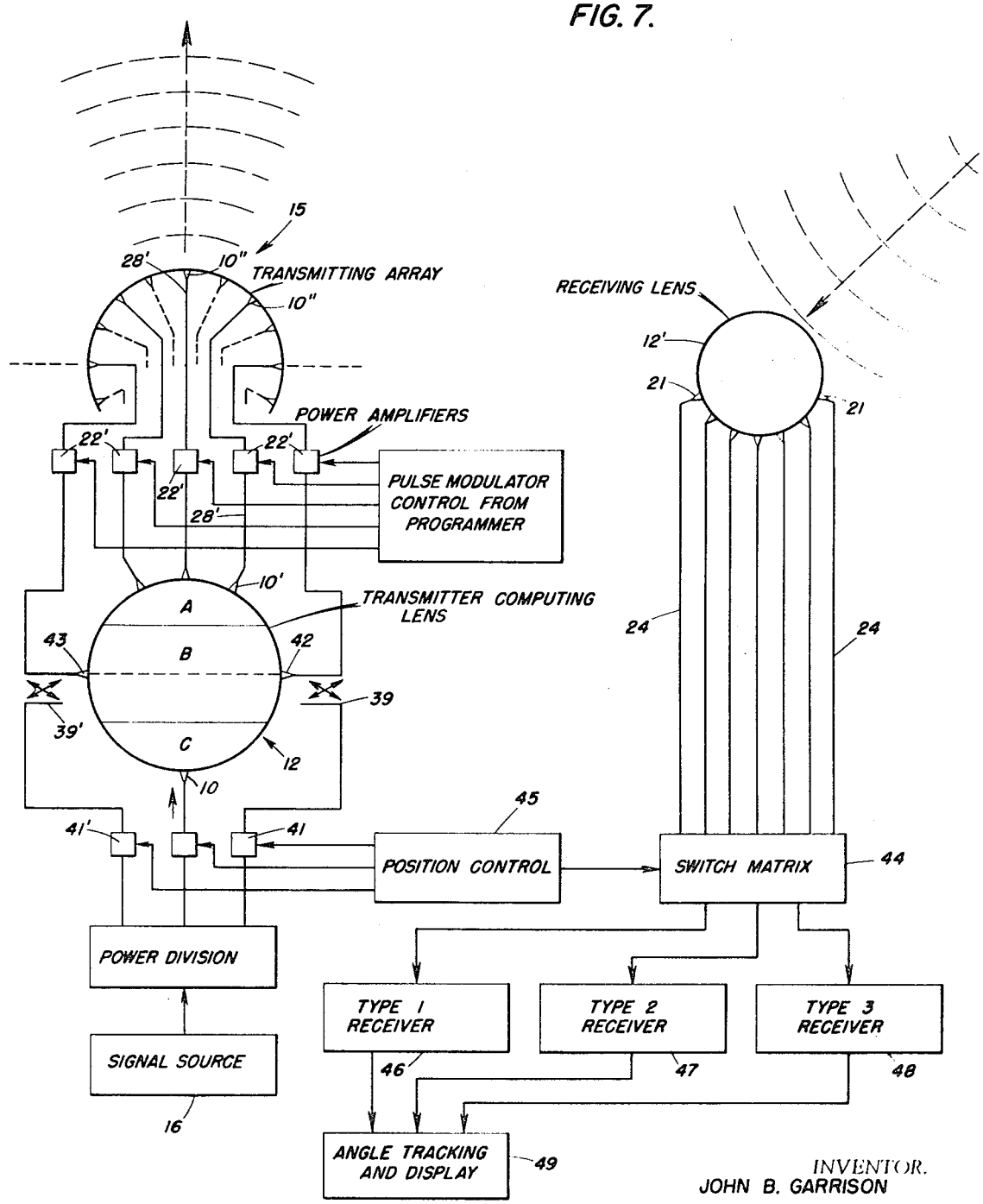
FIG. 7 is a functional block diagram of the radar including a schematic representation of certain elements.

The present invention depends upon the unique properties of a microwave lens, first described in an optical version by R. K. Luneberg and now commonly known as a "Luneberg" lens. The manufacture of such a lens is taught in U.S. Pat. No. 2,849,713 to Glen P. Robinson, Jr. In its theoretical form, the lens comprises a spherical body having an index of refraction (N) which varies in accordance with the relationship $$N_r = \sqrt{2 - \left(\frac{r}{R}\right)^2}$$

wherein $N_r$ is the index of refraction at any radial distance $r$ within the sphere and $R$ is the maximum radius of the sphere.

A lens having a continuously varying index of refraction is difficult to manufacture and consequently the usual practice is to build the sphere of concentric shells of various thicknesses and indices of refraction commencing with a core having an index of refraction of $\sqrt{2}$ and terminating with an outer shell having unity index of refraction. The approximation thus obtained is sufficiently accurate to justify the application of Luneberg's principles to the lens.

FIG. 2 illustrates the unique properties of the Luneberg lens. Namely, that energy from a point source, the single feed 10, applied to the surface of the lens 12 will emerge diametrically opposite the point of application as a plane wave front. Reciprocally, a plane wave front intercepted by the lens will be focused to a point on the surface of the lens diametrically opposite its point of first entry. Moreover, beams may enter the lens at various points simultaneously and will be focused at the proper points opposite their entry without mutual interference.

FIG. 1 illustrate the radar of the present invention. The transmitter 20 includes a signal source 16, and a switching system 18 for connecting the source to selected ones of a plurality of coaxial transmission lines 23, only one of which is shown, A Luneberg lens 12 is completely enclosed by spherical mounting shell 22 which supports a plurality of radar feeds 10, again only is shown, in contact with the lens surface. A feed 10, whose construction is more fully disclosed in FIGS. 3 through 6, is selected by the switching system 18 to receive energy from signal source 16 through the coaxial line 23. Feed 10' on the opposite side of lens 12 introduces power into a coaxial transmission line 28.

Transmission line 28 leads to a power amplifier 22 which may suitably be of the traveling wave type whence signals are conducted through line 28' to a feed 10'' on a transmitting array 14. The array 14 comprises a hollow spherical casting supporting a plurality of substantially uniformly spaced feeds 10''. For simplicity's sake, only a single feed 10'' in the array 14 and a pair of feeds 10 and 10' in contact with the lens 12 are illustrated, although it will later become clear that an extremely large number of such feeds are required, differing only from one another in their spatial orientation.

Three receiving lenses 12' of the Luneberg type are symmetrically positioned about the base of transmitting array 14. A plurality of receiving elements, similar to feeds 10, are supported in castings 15 adjacent the surfaces of lenses 12' so as to apportion equally the entire field of view of array 14.

The sequence of operation is: first, switching system 18 is actuated to select the single feed 10 from those adjacent the lower hemisphere of lens 12 having its axis aligned with the desired direction of beam transmission; second, a number of the power amplifiers 22 diametrically opposite to the selected single feed are simultaneously keyed on activating the corresponding feeds of array 14; and third, a receiving switching system actuates particular ones of the receiving elements having their axes closely aligned to the direction of beam transmission and wherein the appearance of a return signal will indicate the presence of a target. A simultaneous comparison of amplitudes from three adjacent receiving elements, by means later described, permits precise determination of the target bearing.

Referring particularly to FIGS. 3 and 6, the feed 10 comprises a coaxial connector 25 secured to a length 26 of circular waveguide. The connector 25 includes the usual slotted connecting pin 29 and insulating bead 30. A rod 31 press-fitted into pin 29 extends into waveguide 26 and serves to launch waves down the waveguide. Matching structure, including a transformer section 32, a septum 33 and a tapered dielectric transition section 34 is provided to reduce losses in converting the waves from a coaxial mode to a circular waveguide mode. The waveguide 26 is filled with a suitable dielectric insert 35a and 35b which enables a reduction in the waveguide diameter without a corresponding increase in waveguide cutoff frequency. A tapered quarter-wave plate 36 of dielectric material having a substantially different index of refraction from inserts 35a and 35b is sandwiched between those inserts to convert linearly polarized waves in transit therethrough into circularly polarized waves. Reciprocally, circularly polarized waves entering the open end 37 of waveguide 26 will be converted into linearly polarized waves after passing the plate 35.

Referring to the schematic of FIG. 7, the surface of lens 12 is divided into three zones, A, B, and C. Only zones A and C will be considered for the moment. The feeds 10 in contact with zone C may be classified as beam selection feeds, and those in contact with zone A as beam forming feeds 10', although all of the feeds are identical in construction. Thus, to form a beam in space, power is applied to a single one of the feeds 10 in zone C whereupon the lens 12 inherently determines the amplitude and phase of energy discharged so that a plane wave front will emerge diametrically opposite the selected feed. Of practical necessity, the power level in the lens must be kept far below that required for long range operation. The emergent wave is therefore gathered by the beam forming feeds 10' in contact with lens zone A, each of which supplies its output through the coaxial lines 28 to individual power amplifiers 22'. The outputs of amplifiers 22' are each carried through coaxial lines 28' to feeds 10'', formed in an emittive array 14 whence high-powered transmission occurs. The feeds 10'' are precisely arranged in a spherical configuration so that an individual feed 10'' bears the same spherical coordinates as the individual beam forming feeds 10' whence it receives power. The beam emerging from the lens 12 is consequently highly amplified and transmitted without distortion with the same practical result as if energy at a high power level had been applied to the lens by the single beam selector feed 10 and radiated directly from the lens.

The feeds contacting zone B deserve special consideration. Since the radar has been designed with emphasis on the problems encountered at sea, attention must be paid to the effect of ship roll. It is apparent that some method of beam stabilization is required, otherwise a beam directed at the horizon would actually be pointed at an elevation of say 30 degrees were the ship to roll to that extent. Stabilization can be accomplished in two general ways. A stabile platform can be provided upon which the array is mounted and maintained plumb during the various oscillations of the ship. Alternatively, the data itself may be stabilized. The latter method is preferred, not for its simplicity but rather because it requires less power and does not suffer from response limitations. It is necessary when using data stabilization to provide for transmission through somewhat more than $2\pi$ steradians. For example, if the ship is assumed to roll a maximum of 30° then zone B must extend 30° on either side of the equator of the lens. Each of the feeds 10 in contact with the lens in zone B are coupled through then 39 both to a power amplifier 22' leading to a feed 10'' on the array 14 and to an amplifier 41 whence signals are received from the source 16. The circulators 39 permit the feed elements 42 and 43 in zone B to function either as beam selector feeds 10 or as beam-forming feeds 10' as conditions may require. For example, if its is desired to transmit a horizontal beam towards the left of FIG. 7, amplifier 41 is keyed on, supplying a signal to circulator 39. The circulator prevents the signal from flowing directly into power amplifier 22' but permits it to flow easily into feed 42. Diametrically opposite feed 42, feed 43 intercepts a portion of the energy, now distributed in phase and amplitude to form an emergent plane wave. Since the direction of travel through circulator 39' is reversed from that of circulator 39, energy is prevented from flowing into amplifier 41', but must instead flow into a power amplifier 22' as an incremental part of the beam.

The number of feed elements necessary for operation of the radar will now be considered. It has been determined experimentally that the half-power beam width of a Luneberg lens to which power is supplied by a primary feed having dimensions greater than isotropic is given by the following:

$$\theta = 58\lambda/D_L + 2\frac{D_A}{\lambda} \qquad (2)$$

wherein:
$\theta$ = half-power beam width in degrees
$\lambda$ = wavelength of energy radiated
$D_L$ = lens diameter
$D_A$ = feed diameter In one embodiment of the present invention, a 6-foot diameter lens is employed; the required beam width is 1.5° and the wavelength is 0.1 foot. The feed diameter is thus determined to be very nearly equal to one-half wavelength.

The necessary number of feeds is determined by the angle at which adjacent beams are to cross over. It has been stipulated that the desired beamwidth at half-power points is 1.5°. This angle also represents a desirable beam-crossover dimension so that the number of feeds can be found by dividing the spherical angle of the field of view of the lens by the spherical angle of a single beam at the crossover point. Assuming a hemispherical field of view, i.e., $2\pi$ steradians, then the number of feeds, N, is $$N = \frac{2\pi}{\pi\left(\frac{\theta}{2}\right)^2}$$

which for $\theta$ equal to 1.5° or 1/40 radian approximately yields $N$ 12,800.

In actual practice the number of feeds differs somewhat from that determined above due to practical considerations, among which is the impossibility to place more than 20 equally spaced points on the surface of a sphere. The consequences of this limitation and the method spacing the feeds so as to mitigate its effects will be discussed hereinafter. In addition, practical feeds are not isotropic and allowance for this effect must be made.

It is important to note that the beam forming feeds 10' and the feeds 10'' of the array do not necessarily correspond in number or location to the beam selection feeds 10. The characteristics of a beam emerging from the lens are determined in accordance with equation (2) which refers only to parameters of the lens and the beam selection feeds. All that is necessary or desired is to radiate the emergent wave with amplification and without distortion. It is possible therefore to employ wider beam widths and farther spacings on the beam forming and array feeds than is required of the beam selection feeds and yet preserve the predetermined beam characteristics. It is assumed for present purposes, however, that the beam forming the array feeds are identical to the beam selection feeds.

In FIG. 7, only a single receiving lens 12' is illustrated, as the remaining lenses differ only in the location of receiving elements to cover separate portions of the field of view of the transmitter. The output of each receiving element 21 is conducted by separate coaxial lines 24 to a switching matrix 44 which may comprise an arrangement of grid-controlled traveling wave amplifiers. Upon command from a position controlling programmer 45, matrix 44 connects one each of three adjacent receiving elements to separate receivers 46, 47, and 48. The amplitudes of the outputs of receivers 46, 47, and 48 are simultaneously compared in the angle tracking and display circuits 49 which provide target bearing data as an output. The angle tracking and display circuits are illustrated in greater detail in FIGS. 11 and 13. Before proceeding with description of these circuits, the method of locating elements adjacent the surfaces of the transmitting and receiving lenses 12 and 12' will be described thus illustrating the coordinate system chosen for the various elements.

It has been shown that the number of beam selector elements and also the number of receiving elements necessary to provide panoramic coverage with a beam width of 1.5° is in excess of 10,000. It is desirable, of course, that the elements be evenly distributed over at least a hemisphere of the transmitting array 14 and an appropriate one-third of a hemisphere of each receiving lens 12'. Unfortunately, it is theoretically impossible to distribute such a large number of points over the surface of a sphere with perfect uniformity. In fact, no more than 20 equilateral spherical triangles can be constructed on a sphere, these triangles being the projection of the faces of an enclosed icosahedron.

Figure 9:
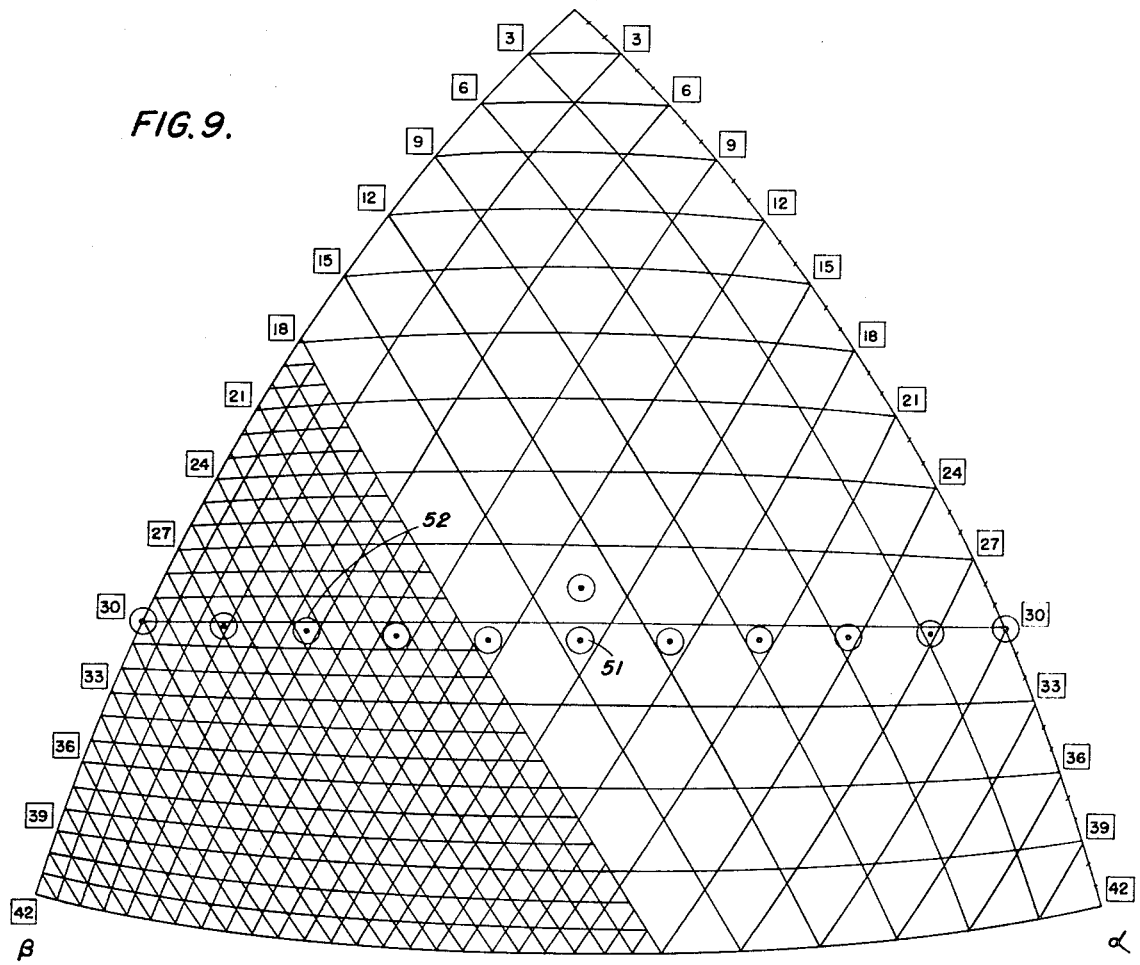
FIG. 9 is a true projection of one of the spherical triangles of FIG. 8 illustrating one manner of locating feed elements within the triangle.

FIG. 8 illustrates an icosahedron enclosed by a sphere and the projection of the faces thereof onto the sphere to form equilateral spherical triangles. Referring to FIG. 9 the sides of each of the spherical triangles are divided into 42 equal parts and corresponding divisions are connected by great circle arcs. That is, commencing at the upper vertex, a line will be seen joining the third division of the right-hand side with the third division of the left-hand side. Lines also extend from the third division of the right-hand side to the third division of the the lower side, counting from the left-hand vertex, and from the third division of the left-hand side to the third division of the lower side counting from the right-hand vertex. FIG. 9 also illustrates the spherical distortion resulting from the impossibility of uniformly spacing the elements. Near the edges of the triangle, the location lines intersect very nearly at a point. Toward the center of the triangle, for example, at the element 51, the location lines do not intersect at a point but rather enclose an area within which the feed is centrally positioned. Having filled the triangle with elements located in accordance with the foregoing considerations, it is necessary only to employ two coordinates to designate a particular element. These coordinates are taken from an $\alpha$-axis extending along the right-hand side of the triangle and a $\beta$-axis extending along the left-hand side of the triangle. Thus element 52 is addressed $\alpha_6$, $\beta_{24}$.

The reception of a signal in any one of the elements is sufficient to locate a target with a gross accuracy equal approximately to the beam width of the antenna. More accurate location of a target is obtained by simultaneously comparing the relative signal strengths from three adjacent elements.

In FIG. 10 a portion of the arrangement of receiving elements has been shown projected onto a plane surface. For present purposes it may be safely assumed that the projection comprises an area containing uniformly distributed elements. Tracking is accomplished by comparing the amplitude of signals in three adjacent elements, and for this purpose the three separate receivers 46, 47 and 48 have been provided.

The elements connected to receiver 46 are identified as type I elements, and those connected to the second receiver 47 as type II elements and those connected to the third receiver 48 as type III elements although the only distinguishing feature between the three types of elements is their relative location. It will be seen from FIG. 10 that the types periodically recur along horizontal lines and that a point anywhere on the surface may be isolated by specifying particular ones of each of the three types of elements forming the corners of a triangle. while all of the elements of a single type are arranged to be connected to a single receiver, it is emphasized that they are selectively rather than simultaneously coupled to their respective receivers. Thus, in tracking, supposing that a target is first detected in the vicinity of the type I element 53, a local search is conducted by examining each of the six triangles A, B, C, etc., surrounding element 53. The local search might commence in triangle A by switching elements 53, 54, and 55 to their respective receivers. If the target is not found there, triangle B is examined by substituting element 56 for 55 in the type III receiver, next element 57 is substituted for element 54 in the type II receiver to examine triangle C and so on until the proper triangle is located. Upon completion of the local search, fine tracking commences.

Figure 11:
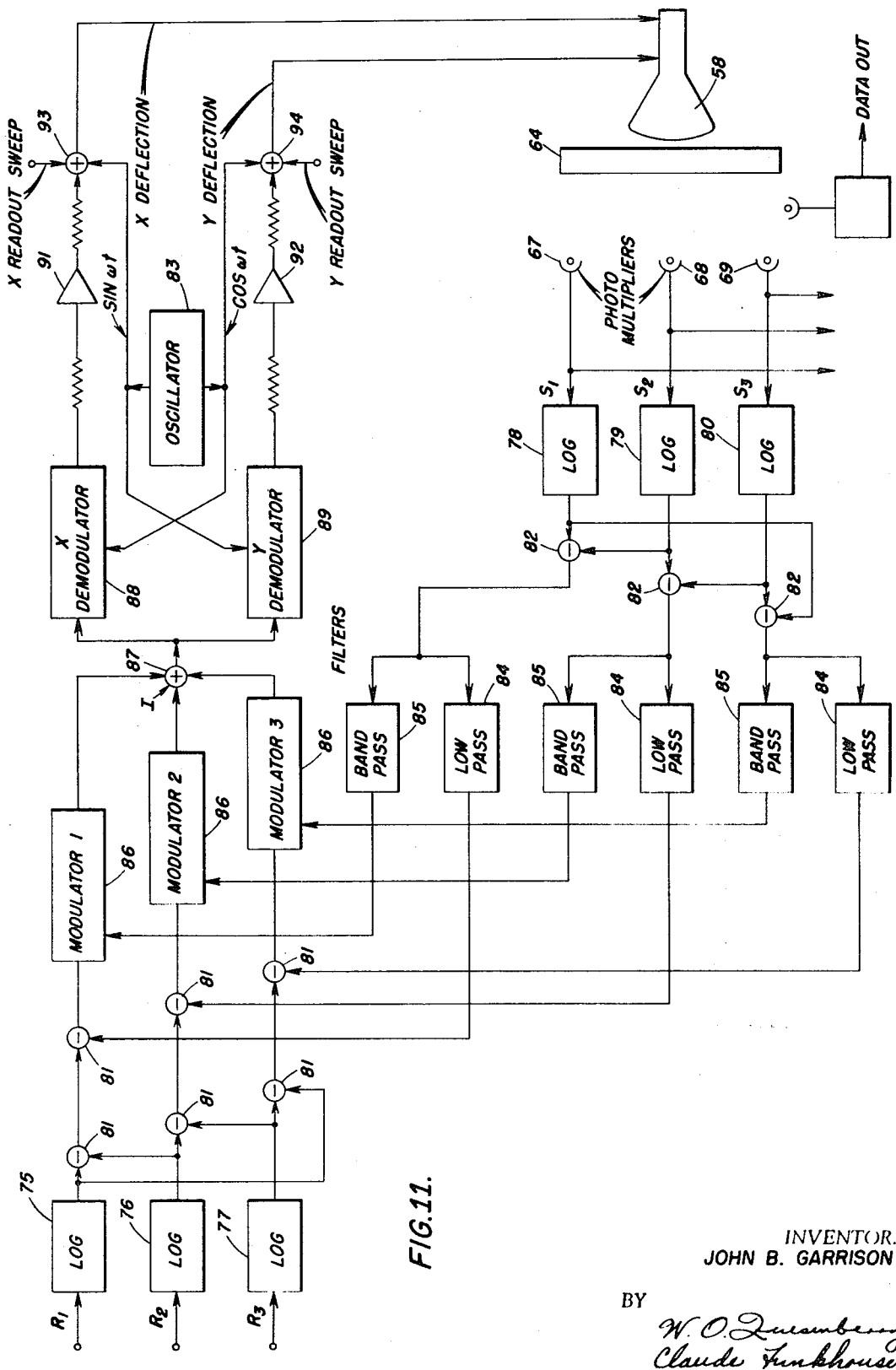
FIG. 11 is a functional block diagram of the target-tracking circuit of the radar.

FIG. 11 illustrates on means for simultaneously comparing the amplitudes of the outputs of the three types of receivers. The nonlinearities introduced by spherical distortion, lack of uniformity amongst the antenna patterns of the many receiving elements, etc., create a tremendous amount of data which must be stored and utilized before accurate find position information can be provided. Corrections can be introduced by means of photographic charts which are the analog of the antenna patterns of the receiving elements. FIG. 12 illustrates a portion of an antenna pattern chart 50. The various centers in the patterns of FIG. 12 are areas of minimum opacity corresponding to the high on axis gain of the receiving elements of one type say type I. Toward the edges, the chart grows more dense in accordance with the decrease in amplitude resulting from the directivity of the antenna elements. Similar charts are provided for the remaining two types of elements so that by positioning the charts in the same relative position as the receiving elements which they represent, the intensity of a light beam passing through the charts will be modified in a manner analogous to the differences in the strengths of a signal received simultaneously in three adjacent elements.

Figure 13:
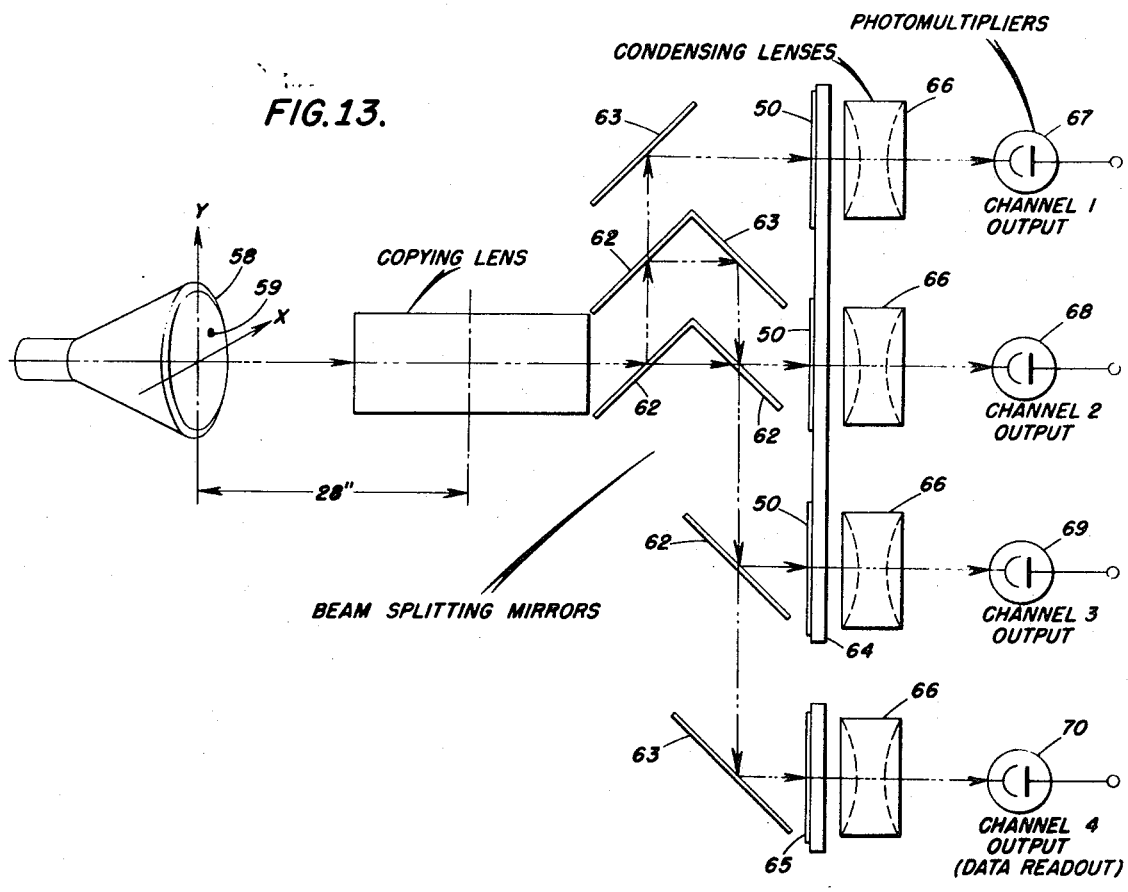
FIG. 13 is a schematic of the optical system employed in tracking targets.

FIG. 13 illustrates an optical system which employs the charts of FIG. 12 as antenna pattern storage devices. The face of a cathode-ray tube 58 represents a selected area of the surface of the receiving Luneberg lens of FIG. 7. The position of the cathode-ray spot 59 is analogous to the position of a target source relative to the represented area of one of the Luneberg lenses 12'. An optical lens 61 together with half-silvered mirrors 62 and full-silvered mirrors 63 projects simultaneously four images of the cathode-ray tube face onto a focal plane mounting structure 64. Three images are focused upon the translucent charts 50 for the three receiving element types. The fourth image is focused on a data readout chart 65 and phototube 70, later to be described. Condensing lenses 66 are positioned to receive the light transmitted by the three separate charts to illuminate three separate photomultiplier tubes 67, 68, and 69. Simultaneous comparison of the amplitudes of the output signals of the photomultiplier tubes indicates the location of the cathode-ray spot within a triangular area having species defined by one center from each of the charts 50. In the operation of the tracker, the cathode-ray beam is deflected until the outputs of the phototubes 67, 68, and 69 are related to one another in similar proportions to the strength of the outputs of the three receivers 46, 47, and 48. The spot position is then the analog of the target position and the target position may be determined by measurement of the beam deflection voltages or by a suitable digital determination of the beam position.

In more detail, the desired relationship of phototube output to receiver output is $$\frac{S_1}{R_1} = \frac{S_2}{R_2} = \frac{S_3}{R_3} = \frac{S_1+S_2+S_3}{R_1+R_2+R_3}$$

where $R_1$, $R_2$, and $R_3$ are the signal amplitudes of receivers 46, 47, and 48, and $S_1$, $S_2$ and $S_3$ are the outputs of phototubes 67, 68, and 69.

Figure 14:
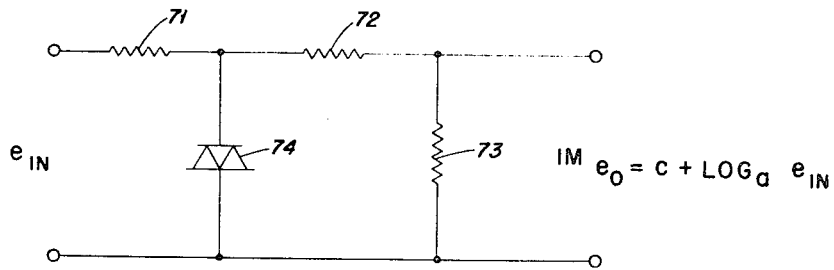
FIG. 14 is a schematic of a circuit useful in providing a logarithmic response to an applied voltage.

The ratios $S_1/R_1$ etc. are most easily computed by taking the difference of the logarithms of the quantities. A simple circuit which yields a logarithmic response to an applied voltage is illustrated in FIG. 14. A voltage divider comprising resistors 71, 72, and 73 is shunted in part by a nonlinear resistor 74 of the thyrite type. The response of the logarithmic circuit is given by the function $$e_o = C + \log e_i,$$

where $e_o$ is the output voltage and $e_i$ is the applied voltage.

FIG. 11 illustrates the tracking circuit in which the signals $R_1$, $R_2$, and $R_3$ of receivers 46, 47 and 48, respectively, are compared with the outputs $S_1$, $S_2$, and $S_3$ of phototubes 67, 68 and 69, respectively, for the purpose of deriving suitable deflection voltages for cathode-ray tube 58. FIG. 11 is simplified to the extent that gating arrangements permitting the tracker to operate with multiple targets have been eliminated. Receiver signals $R_1$, $R_2$, and $R_3$ are applied to logarithmic circuits 75, 76, and 77 of the type shown in FIG. 14. Phototube outputs $S_1$, $S_2$, and $S_3$ are applied to similar logarithmic circuits 78, 79, and 80. Differences between the logarithms of the receiver outputs and the phototube outputs are taken in difference amplifiers symbolically represented as at 81 and 82. Differences between the logarithms of the various quantities are taken in such order as to yield an error signal function shortly to be set forth. First, it is necessary to consider that as thus far described, the simple comparison of ratios of phototube outputs to receiver signal fails to provide sufficient information from which appropriate deflection voltages can be derived. It is required that the error signal be resolved into rectangular coordinates of the proper algebraic sign to drive the cathode-ray spot to a position analogous to the target position.

Sense is supplied to the error signal derived in the apparatus of FIG. 11 by adding a small nutation voltage to the deflection voltage. The nutation voltage is supplied as the output of an oscillator 83 operating at a frequency $\omega$. Nutation produces a phototube output which can be separated into DC and AC components and for this purpose both a low pass filter 84 and a band-pass filter 85 are connected to each of the logarithm circuits 78, 79, and 80.

The logarithms are combined in such a manner as to produce an error signal, I, of the following form:

$$I = (\log R_1 - \log R_2 - D_{12}) A_{12}$$
$$+ (\log R_2 - \log R_3 - D_{23}) A_{23}$$
$$+ (\log R_3 - \log R_1 - D_{31}) A_{31}$$

wherein $D_{12}$ is the DC component of $\log S_1 - \log S_2$ etc., and
$A_{12}$ is the AC component of $\log S_1 - \log S_2$, etc.

It can be proved that upon combination of the logarithms in accordance with equation 4 the resultant error signal is composed of two rectangular coordinates as follows:

$$I = K[(X_T - X_S) \cos \omega t + (Y_T - Y_S) \sin \omega T]$$

wherein
$K$ is a constant
$X_T$, $Y_T$ are the target rectangular coordinates; and
$X_S$, $Y_S$ are the spot coordinates for the cathode-ray tube.

The multiplication of the quantities $\log R_1 - \log R_2 - D_{12}$ by $A_{12}$, etc., are accomplished by modulators 86, the outputs of which are added at junction 87 to produce the error signal, $I$. Phase-sensitive demodulators 88 and 89 receive the error signal $I$ and reference signals from oscillator 83. The output of the demodulator 88 is that portion of the error signal in phase with its reference input and consequently is proportional to $(X_T - X_S)$. Similarly, the output of demodulator 89 is a direct voltage proportional to $(Y_T - Y_S)$. Each of the rectangular coordinate error signals is fed to an amplifier 91 and 92, and thence to summing junctions 93 and 94 where the quadrature outputs of oscillator 83 are added.

Figure 15:
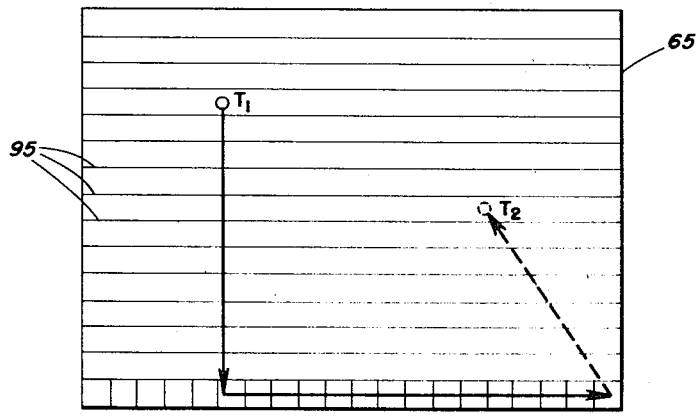
FIG. 15 is an example of a calibration chart employed in reading out target position data.
Figure 16:
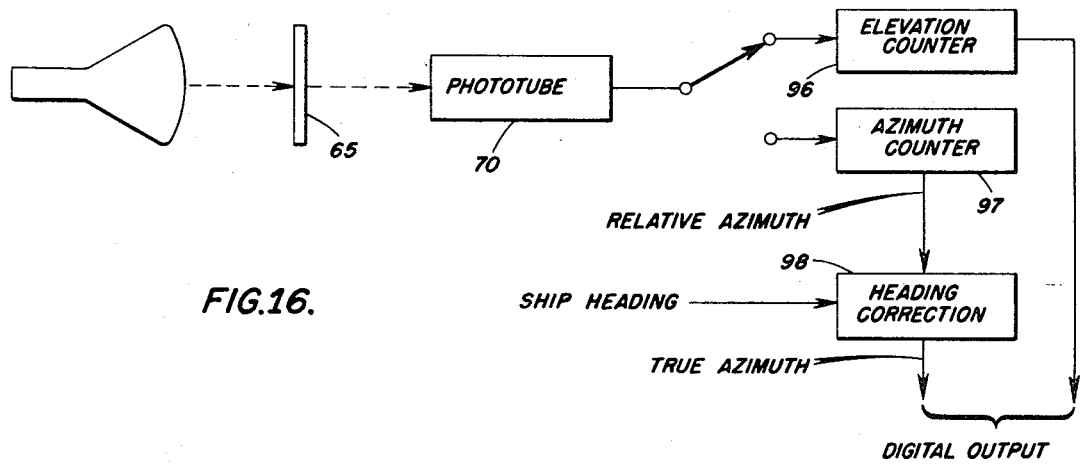
FIG. 16 is a schematic of the data output channel of the radar.

The data channel illustrated in FIGS. 11 and 13 provides target position information in digital form by means of the calibration chart 65 of FIG. 15 and the counter arrangement of FIG. 16. When it is desired to read the target position, or to store the target coordinates during multiplex tracking of more than a single target, a vertical readout sweep is applied to summing junction 94 of FIG. 11. The readout deflection moves the spot directly downward generating an impulse in phototube 70 for each of the horizontally disposed calibration marks 95 passed. These impulses are accumulated in an elevation counter 96 (FIG. 16) which directly or remotely displays the result. Upon reaching the bottom of the chart, the output of phototube 70 is switched to the azimuth counter 97 and an $x$ readout sweep is applied to junction 93 (FIG. 11) generating an impulse for each of the vertically disposed calibration marks. A heading correction computer 98 corrects the output of azimuth counter 97 to provide true target bearings.

Figure 17:
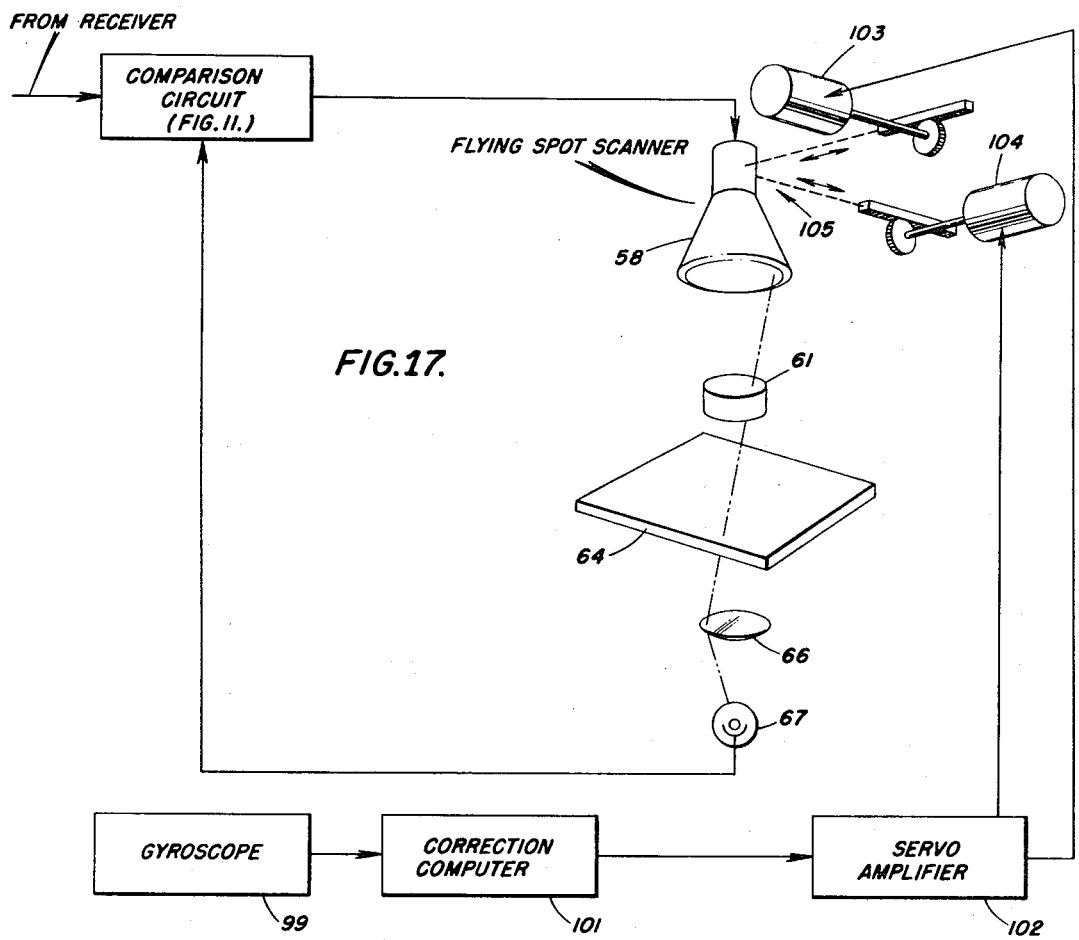
FIG. 17 is a schematic of the data stabilization system of the radar.

FIG. 17 illustrates a means for stabilizing data output to correct for ship roll and pitch. The structure 105 carrying the cathode-ray tube 58 is mounted for reciprocating motion along both the $x$ and $y$-coordinate axes. A gyroscope 99 detects motion of the ship and provides an output in suitable form to a correction computer 101. The computer 101 resolves the errors induced by yawing, pitching, or rolling of the ship into appropriate $x$ and $y$ error signals. The error signals are applied through an amplifier 102 to servomotors 103 and 104 which reciprocate structure 105 thereby effectively stabilizing the data output of the radar.

Obviously many modifications and variations of the present invention are possible in the light of the above teachings. For example, referring to FIGS. 1 and 7, it may be desirable to construct the array 14 upon a form having a radius $R_2$ different from the radius $R_1$ of the lens. A larger radius $R_2$ would provide a greater surface for the distribution of the feeds 10'', or it may be desirable to employ a lens of minimum size because of complexities of manufacture.

In one instance, the array radius $R_2$ may be increased with respect to the lens radius $R_1$ by modifying the usual Luneberg equation to read $$N_R = K \sqrt{2 - \left(\frac{r}{R}\right)^2}$$

wherein $K$ is the ratio of the radius $R_2$ to the radius $R_1$. In another instance, the array radius may be increased with respect to the lens radius by applying a high-frequency signal to the lens, and after passing through the lens but prior to amplification in the power amplifiers 22, each of the signals are mixed with the output of a common local oscillator thereby reducing the frequency of the signals to be amplified. Actual transmission then occurs at the lower frequency of the power amplifiers outputs. According to this latter modification the radius $R_2$ of the array is related to the radius $R_1$ of the lens as follows: $R_2/R_1 = f_1/f_a$
wherein $f_1$ is the frequency of the signal applied to the lens and $f_a$ is the frequency of the signal transmitted by the array. Also, the index of refraction $N_R$ of the lens would follow the ordinary Luneberg characteristic, that is, $K=1$.

It is therefore to be understood that within the scope of the appended claims the invention may be practiced otherwise than as specifically described.

What is claimed is:

1. A radar comprising a spherical lens, wave-generating means, a plurality of feed means positioned adjacent the surface of said lens for applying the output of said wave-generating means at selected points on the surface of said lens, and switching means for selectively connecting individuals of said feed means to said wave-generating means to transmit a beam of energy along an axis determined by the position upon the surface of said lens of the particular feed means selected.

2. A radar as claimed in claim 1 wherein said lens is of the Luneberg type comprising a sphere of radius $R$ possessing an index refraction $N_R$ at any radial distance $r$ within said sphere determined in accordance with the relationship $$N_R = \sqrt{2 - \left(\frac{r}{R}\right)^2}$$

3. A radar comprising a spherical lens of the Luneberg type, a plurality of feed means positioned adjacent said lens, wave-generating means, and switching means for selectively connecting said feed means to said wave-generating means to transmit a beam of energy along the projection of the radius of said lens intersecting the particular feed means connected to said wave-generating means.

4. In a radar, a spherical lens of the Luneberg type, a plurality of feeds substantially uniformly distributed adjacent the surface of said lens, a plurality of radiating elements, said elements being supported upon a spherical form whence beams of energy may be launched in any desired direction, means connecting certain of said feeds with said radiating elements, wave-generating means, and means for selectively connecting certain others of said feeds to said wave-generating means.

5. In a radar, a spherical lens of the Luneberg type, wave-generating means, a plurality of feeds adapted to be selectively connected to said wave-generating means and substantially uniformly distributed over at least a portion of the surface of said lens for launching a wave into said lens from a point on a selected diameter thereof, a second plurality of feed means substantially uniformly distributed over a portion of the surface of said lens diametrically opposite the portion of the lens adjacent said first plurality of feeds, said second plurality of feeds serving to collect a wave emergent from said lens, a plurality of radiating elements, said radiating elements being supported upon a spherical form to provide a convex array of said elements similar to the surface of said lens adjacent which said second plurality of feeds is distributed, and means connecting individually the feeds of said second plurality with similarly situated individuals of said radiating elements.

6. A radar comprising microwave generating means, a microwave lens of the Luneberg type, means for launching microwaves from said generating means into said lens at a plurality of selected points, means for gathering waves emergent from said lens, radiating means connected to said gathering means for launching waves collected thereby into space, a second microwave lens of the Luneberg type for receiving waves reflected from a target in space, a plurality of means situated at selected points on the surface of said second lens for collecting waves entering the second lens and thereby focused to a point, and means for comparing simultaneously the amplitude of the outputs of selected ones of said collecting means to provide an indication of the direction whence the received waves are emanating.

7. A radar transmitter comprising a source of microwaves, a plurality of amplifying means, a power divider for supplying microwaves from said source to aid amplifying means in substantially equal increments, a microwave lens of the Luneberg type, a first plurality of feed means substantially uniformly spaced adjacent a portion of the surface of said lens, each of said feed means being connected to individual ones of said amplifying means, and means for selectively actuating individual ones of said amplifying means to launch a wave into said lens at selected points.

8. A transmitter as claimed in claim 7, with additionally, a second plurality of feed means substantially uniformly spaced adjacent a portion of the surface of said lens diametrically opposite said first plurality of feed means, a second plurality of amplifying means each of which is individually connected to individuals of said second plurality of feed means, and a plurality of radiating elements individually connected to individuals of said second plurality of amplifying means.

9. A radar receiver comprising, a microwave lens of the Luneberg type, a plurality of feed means substantially uniformly distributed adjacent a portion of the surface of said lens, first, second, and third receiving means, a first group of said feed means being connected to said first receiving means, a second group of said feed means being connected to said second receiving means, a third group of said feed means being connected to said third receiving means, the order of said first, second and third groups being such that a point on the surface of said lens may be isolated by the selection of a single feed from each of said groups, and means for simultaneously comparing the amplitudes of the outputs from said first, second and third receiving means.

10. A radar comprising, wave-generating means, a first microwave lens of the Luneberg type, feed means for launching waves into said first lens from selected points on the surface thereof, collecting means for gathering waves emergent from said first lens, radiating means supplied by said gathering means for launching waves in space, structure supporting said radiating means in an elevated position, a plurality of second microwave lenses of the Luneberg type, said second lenses being positioned symmetrically about said radiating means and supported at a lower elevation than said radiating means, second collecting means distributed at points adjacent the surfaces of said second lenses, and receiving means connected to said second collecting means for detecting signals entering said second lenses.

11. A radar comprising, microwave-generating means, a spherical lens of the Luneberg type, a first plurality of feed means substantially uniformly distributed over a first zone of the surface of said lens, a second plurality of feed means substantially uniformly distributed over a second zone of the surface of said lens, a third plurality of feed means substantially uniformly distributed over a third zone of the surface of said lens, said first, second and third zones of said lens being defined by the intersection with the lens of a pair of horizontal parallel planes, the first zone being that portion of the surface of said lens above the uppermost of the intersecting planes, the second zone being that portion of the surface of said lens between the intersecting planes, the third zone being that portion of the surface of said lens beneath the lowermost of the intersecting planes, a plurality of radiating elements formed into an emittive array having a spherical contour, means connecting similarly positioned ones of said first plurality of feed means to ones of said radiating elements, means for selectively connecting ones of said third plurality of feed means to said microwave-generating means, and means including bidirectional couplers for selectively connecting ones of said second plurality of feed means to said microwave-generating means and also to similarly positioned ones of said radiating elements.

12. A radar as claimed in claim 11, with additionally, a plurality of spherical receiving lenses of the Luneberg type, said receiving lenses being positioned symmetrically about said emittive array of radiating elements, a plurality of collecting means substantially uniformly distributed adjacent a portion of the surface of each of said receiving lenses, said collecting means being divided into first, second and third groups according to their relative positions so that the selection of a particular one from each of said groups will define a triangular portion of the surface of one of said receiving lenses, first, second and third receivers to which said collecting means are connnected, and means for simultaneously comparing the amplitudes of the outputs of said receivers.

13. A radar as claimed in claim 12, wherein said last named means comprises an optical mask having varying opacity corresponding to the sensitivities of said collecting means adjacent said receiving lenses, a movable light source, and means for moving said light source to a position wherein the amount of light transmitted by said mask is proportional to the outputs of said receivers.

14. A radar comprising a transmitter for launching a beam of microwave energy into space, a spherical receiving lens of the Luneberg type, a plurality of feed means substantially uniformly spaced adjacent a portion of the surface of said lens, said feed means being divided into first, second and third groups according to their relative positions so that the selection of a particular feed from each of said groups will define a triangular portion of the surface of said lens, a first receiver to which feeds of said first group may be selectively connected, a second receiver to which feeds of said second group may be selectively connected, a third receiver to which feeds of said third group may be selectively connected, an optical mask having areas of graduated opacity thereon corresponding to the location and sensitivity of individuals of said feed means, a movable light source, beam-splitting means for projecting a triple image of said light source upon said mask, one each of said triple images being projected upon a portion of said mask representing the response of one each of said feed means from said first, second, and third groups, individual means for determining the intensity of light projected through said mask by each image of said triple images, and means for comparing the outputs of said light-detecting means with corresponding outputs of said first, second, and third receivers to caused said light source to move to a position wherein the outputs of said light-detecting means bear the same relationship to one another as the outputs of said first, second, and third receivers.

15. Apparatus as claimed in claim 14, with additionally, a transparent calibration chart having opaque graduations corresponding to space coordinates referenced to said receiving lens, means projecting a fourth image of said light source upon said calibration chart, means for detecting the light projected through said chart by said fourth image, and counting means connected to said last named means for providing an indication of the space coordinates of the source of the energy entering said receiving lens.

16. Apparatus as claimed in claim 15, with additionally, data stabilization means including means for moving both said optical mask and said calibration chart, a gyroscope providing an output related to the departure of said transmitter and said receiving lens from a stabile reference axis, and means for resolving the output of said gyroscope into rectilinear components to control the position of said optical mask and said calibration chart.

* * * * *